US007375164B2

(12) United States Patent
Weidenhaupt et al.

(10) Patent No.: US 7,375,164 B2
(45) Date of Patent: May 20, 2008

(54) USE OF METAL ALKANEDITHIOLS AS CROSSLINKING AGENTS FOR UNSATURATED RUBBERS

(75) Inventors: Hermann-Josef Weidenhaupt, Pulheim (DE); Hartmuth Buding, Titz (DE); Josef Hahn, Köln (DE); Nicole Häp, Hürth (DE); Petra Pallogh, Leipzig (DE); Nesibe Ucal, Leverkusen (DE); Uwe Zettl, Hürth (DE)

(73) Assignee: LANXESS Deutschland GmbH, Leverkusen (DE)

( * ) Notice: Subject to any disclaimer, the term of this patent is extended or adjusted under 35 U.S.C. 154(b) by 302 days.

(21) Appl. No.: 11/119,582

(22) Filed: May 2, 2005

(65) Prior Publication Data

US 2006/0025538 A1    Feb. 2, 2006

(30) Foreign Application Priority Data

May 5, 2004    (DE)    ............ 10 2004 022 106

(51) Int. Cl.
*C08C 19/20*    (2006.01)
*C08F 8/34*    (2006.01)
*C08J 3/24*    (2006.01)
*C08K 5/36*    (2006.01)

(52) U.S. Cl. .................... 525/332.6; 525/332.5; 525/333.9; 525/343; 525/370; 525/331.9

(58) Field of Classification Search ........... 525/343, 525/370, 331.9, 332.5, 332.6, 333.9
See application file for complete search history.

(56) References Cited

U.S. PATENT DOCUMENTS

| 3,781,250 A | 12/1973 | Wolpers ............ 260/79.5 |
| 5,221,559 A | 6/1993 | Martigny et al. ...... 427/419.5 |
| 5,342,900 A | 8/1994 | Wolpers et al. ........ 525/329.3 |

FOREIGN PATENT DOCUMENTS

WO    90/12826    11/1990

OTHER PUBLICATIONS

Mabrouk et al., Inorganica Chimica Acta 145 (1988) 237-241.*
W. Hofmann, Kautschuk-Technologie [Rubber Technology], Genter Verlag, Stuttgart, 1980, p. 64 and 254-255.
R.N. Datta and W.F. Helt, Flexsys B.V. Rubber World, Aug. 1997, p. 24 seq. "Optimizing tire compound reversion resistance without sacrificing performance characteristics".
H.E. Mabrouk et al.; Inorganica Chimica Acta, 145 (1988), pp. 237-241 "The Direct Electro-Chemical Synthesis of Zinc and Cadmium Derivatives of α,ω-Alkanedithiols and their Reaction with Carbon Disulphide".
Database WPI Section Ch, Week 198720 Derwent Publications Ltd., London, GB; AN 1987-140999 XP002337614 & JP 62 081441 A (Japan Synthetic Rubber Co. Ltd.) Apr. 14, 1987 Zusammenfassung.*
Database WPI Section Ch, Week 198202 Derwent Publications Ltd., London, GB; AN 1982-02721e XP002337615 & JP 56 149446 A (BridgeStone Tire KK) Nov. 19, 1981 Zusammenfassung.*

* cited by examiner

*Primary Examiner*—Robert Rábago
(74) *Attorney, Agent, or Firm*—Nicanor A. Kohncke

(57) ABSTRACT

The present invention relates to vulcanizing agent containing metal alkanedithiols for unsaturated rubbers.

10 Claims, No Drawings

USE OF METAL ALKANEDITHIOLS AS CROSSLINKING AGENTS FOR UNSATURATED RUBBERS

CROSS REFERENCE TO RELATED PATENT APPLICATIONS

The present patent application claims the right of priority under 35 U.S.C. §119 (a)-(d) of German Patent Application No.s DE 1020040221065 filed on 5 May 2004.

FIELD OF THE INVENTION

The present invention relates to the use of metal alkanedithiols as crosslinking agents for unsaturated rubbers.

BACKGROUND OF THE INVENTION

Sulphur continues to be the most commonly used vulcanizing agent for unsaturated rubbers, e.g. natural rubber (NR), isoprene rubber (IR), butadiene rubber (BR) and styrene-butadiene rubber (SBR). From about 0.25 to 5.0 parts by weight of sulphur, based on 100 parts by weight of rubber, are used in the production of soft rubber. The amount of sulphur effectively used depends on the selected amount of vulcanization accelerator, and this is ultimately determined via the vulcanizate properties desired.

Vulcanization systems very frequently used are the conventional vulcanization system and the semi-efficient vulcanization system. The conventional vulcanization system has high sulphur content and low content of vulcanization accelerator, whereas the semi-efficient vulcanization system has a moderate proportion of sulphur and of vulcanization accelerator. The typical proportions are known to the person skilled in the art. By way of example, they are described in W. Hofmann, Kautschuk-Technologie [Rubber Technology], Genter Verlag, Stuttgart, 1980, p. 64 and 254-255. Conventional vulcanization systems give vulcanizates with good resistance to dynamic load, but these are very susceptible to ageing and reversion. Semi-efficient vulcanization systems usually give vulcanizates which have less resistance to dynamic load but are somewhat more resistant to ageing and reversion.

Reversion is a network-bridging-rearrangement process which takes place on heating in the absence of oxygen, causing impairment of service properties of the vulcanizate and therefore being undesirable (anaerobic ageing). Reversion inevitably takes place in one instance during the vulcanization of very thick and voluminous components, e.g. truck tyres and fenders. Physical explanation of this is simple: when the inner parts of the rubber mixture have been vulcanized to exactly the right extent via the heat flux introduced by way of the hot vulcanization mould, those parts of the rubber mixture that are immediately adjacent to the hot vulcanization mould have naturally by this stage been over-vulcanized. Secondly, heat build-up occurs in the rubber component during its use when there is prolonged, intensive dynamic load due to hysteresis deficiencies (in tyre flexing), the result of this being vulcanizate reversion. The extent of reversion can even be sufficient to cause breakdown of the vulcanizate.

In recent years, some specialized reversion stabilizers have been disclosed, and these either minimize reversion via incorporation of network bridges which are thermally stable and practically incapable of reversion (cf. EP 530 590), or replace the fractured conventional sites in the network by other more stable sites after reversion has occurred (cf. R. N. Datta and W. F. Helt, Rubber World, August 1997, p. 24 seq).

Examples of specialized reversion stabilizers available commercially are the disodium salt of hexamethylene 1,6-dithiosulphate dihydrate and 1,3-bis(citraconimidomethyl) benzene.

A general disadvantage of these commercially available specialized reversion stabilizers is their relatively high price, partly the result of starting materials available only in limited quantities, and also of the difficult and complicated preparation of these products, therefore preventing any broad use in the rubber-processing industry, which is subject to constant pressure for cost reduction, and especially in the tyre industry. One specific disadvantage of the disodium salt of hexamethylene 1,6-dithiosulphate dihydrate is its inconvenient supply form. Because it has the character of a salt, it has to be very finely ground to permit good incorporation by mixing, but the result of this is that the powder has to be oil-coated for reasons of health and safety at work, to suppress dusting.

One specific disadvantage of 1,3-bis(citraconimidomethyl)benzene is that within the vulcanizate it can become active only when reversion has already begun in the sulphur-crosslinked unsaturated rubber, and when, therefore, conjugated olefins have formed, which themselves can undergo a post-crosslinking reaction with the citraconic derivative (via a Diels-Alder reaction) to give a new network, but a network of a different type.

A disadvantage of the vulcanizing agents of EP 530 590 is that their molecular weight is high when compared with the actual species active in crosslinking.

The preparation of $\alpha,\omega$-alkanedithiols derivatized by zinc, by cadmium, by indium, by thallium, by copper or by silver has long been known. For example, H. E. Mabrouk et al. (Inorganica Chimica Acta, 145 (1988), 237-241) describes the direct electrochemical synthesis from zinc or cadmium to give the corresponding derivatives. There is no description of use of a crosslinking agent for unsaturated diene rubbers.

EP 0 383 150 describes the use of cobalt hexanyidithiol or of nickel hexanyldithiol as an adhesion promoter for adhesive mixtures based on unsaturated rubbers. These mixtures are usually crosslinked by adding large amounts of sulphur, and the adhesion promoter is intended to improve adhesion between the sulphur-crosslinked rubber matrix and the reinforcing material (brass-plated steel cord). There is no description of any use as crosslinking agent.

Wide-scale production of vulcanizates from unsaturated rubbers usually uses only sulphur and accelerators as vulcanizing agents, i.e. uses no agents which prevent or reduce reversion. However, rubber vulcanizates produced conventionally, using conventional and semi-efficient vulcanization systems, have unsatisfactory properties. There is therefore a need for a vulcanizing agent for unsaturated rubbers which is largely based on components which are readily available in large quantities at low cost, can partially or completely replace exudation-susceptible crystalline sulphur, and which gives vulcanizates with improved resistance to reversion, in particular after overheating.

SUMMARY OF THE INVENTION

Surprisingly, the object has been achieved via vulcanization of an unsaturated rubber mixture using specific metal alkanedithiols.

The present invention therefore provides vulcanizing agents of metal alkanedithiols of the formula $$M^{2+}[S-(CH2)6-S]^{2-} \quad (1)$$

where M=Zn, Cu, Fe, Mn for production of unsaturated rubber vulcanizates.

The present inventive metal alkanedithiols of the formula mentioned are obtained via reaction of the corresponding metal salt with 1,6-hexanedithiol in a suitable solvent. The precipitated product is isolated by filtration, washed, and then dried.

DETAILED DESCRIPTION OF THE INVENTION

The present inventive metal alkanedithiols of the above formula can be used as vulcanizing agents for unsaturated rubber mixtures for production of rubber mouldings, e.g. hoses, gaskets, engine mountings and fenders, but particularly for production of tyre components, e.g. treads, wire caps, sidewall sections and bead sections, shoulder blocks, belt coverings, cap plies and sidewalls.

The preparation of rubber mixtures for vulcanization takes place in a manner known per se by a conventional mixing of the unsaturated rubber components with the known additives, such as carbon black, silica, plasticizer, antioxidant, zinc oxide, stearic acid, resin, processing aid, and also the vulcanization system containing the present inventive metal alkanedithiols and, if appropriate, addition of elemental sulphur.

The present inventive metal alkanedithiols may be used during preparation of the parent mixture, providing meticulous exclusion of an incipient vulcanization, or may preferably be used during preparation of the finished mixture together with the vulcanization accelerators and sulphur, if desired.

Examples of unsaturated rubbers for the purposes of the present invention include natural rubber (NR), isoprene rubber (IR), butadiene rubber (BR) and styrene-butadiene rubber (SBR), which may have been prepared by the emulsion process or else by the solution process, nitrile rubber (NBR), partially hydrogenated nitrile rubber (HNBR) and ethylene-propylene-diene rubber (EPDM). Equally good results are obtained with blends of these rubbers.

There is no restriction on the use of carbon blacks for the rubber mixtures. It is preferable to use the carbon blacks typically used in the rubber-processing industry, for example active or semi-active carbon blacks. There is likewise no restriction on the use of silicas. Preference is given to fine-particle silicas prepared via precipitation from solutions of silicates or via flame hydrolysis of silicon halides. The specific surface area of preferred silicas is about 20 to 400 m²/g (BET surface area) and their primary particle size is from 10 to 400 nm.

The amounts used of the present inventive metal alkanedithiols, based on 100 parts by weight of rubber, are from about 0.2 to 10 parts by weight, preferably from 0.5 to 6.0 parts by weight. If sulphur is also to be used, the sulphur used may be that usually used in the rubber-processing industry, or else insoluble sulphur. The preferred amount of sulphur is from about 0.05 to 2.5 parts by weight, preferably from 0.1 to 1.5 parts by weight, based on 100 parts by weight of rubber.

Instead of sulphur, the known sulphur donors may, of course, also be used, an example being caprolactam disulphide, or else mixtures with sulphur. The advantageous amount of sulphur donor for the intended use can easily be determined via preliminary experiments.

There is no restriction on the vulcanization accelerators which may be used, which may be of a very wide variety of types. It is preferable to use mercaptobenzothiazole (MBT), dibenzothiazyl disulphide (MBTS), sulphenamides based on MBT, e.g. benzothiazyl-2-cyclohexylsulphenamide (CBS), benzothiazyl-2-dicyclohexylsulphenamide (DCBS), benzothiazyl-2-tert-butylsulphenamide (TBBS) and benzothiazyl-2-sulphene morpholide (MBS). The amounts used of vulcanization accelerators are from 0.3 to 5.0 parts by weight, preferably from about 0.5 to 3.5 parts by weight, based on 100 parts by weight of rubber used. However, it is also possible to use mixtures of vulcanization accelerators, and the ideal composition of these, in relation to type and amount, can readily be determined experimentally.

The present inventive rubber mixtures are vulcanized in a known manner at temperatures of from about 120 to 220° C., preferably from 140 to 180° C.

EXAMPLES

Preparation of Inventive Metal Alkanedithiols of the Formula (I)

Example 1

Synthesis of $Zn^{2+}[S-(CH2)6-S]^{2-}$ 1.50 ml (9.93 mmol) of 1,6-hexanedithiol were used as initial charge in 25 ml of methanol in a 100 ml glass beaker. 1.83 g (11.3 mmol) of zinc(II) acetate dihydrate was slowly added dropwise in 25 ml of methanol, with stirring. The precipitate was isolated by filtration, washed with methanol and dried. The yield was 2.10 g (99%).

The compound melted at 295° C. with decomposition.

Example 2

Synthesis of $Cu^{2+}[S-(CH2)6-S]^{2-}$ 2.00 g (9.19 mmol) of cupric acetate dihydrate was dissolved, with stirring, in 50 ml of N,N-dimethylformamide in a 100 ml Erlenmeyer flask. The solution was added in portions to a solution of 1.50 ml (9.93 mmol) of 1,6-hexanedithiol in 25 ml of N,N-dimethylformamide in a 250 ml round-bottomed flask. The solution first became yellow and then a green precipitate was produced. The precipitate was isolated by filtration, washed repeatedly with N,N-dimethylformamide and dried. The yield was 1.73 g (89%).

The compound melted at 175° C. with decomposition.

Example 3

Synthesis of $Fe^{2+}[S-(CH2)6-S]^{2-}$ 1.50 ml (9.93 mmol) of 1,6-hexanedithiol and 1.99 g (10.0 mmol) of ferrous dichloride tetrahydrate was used as initial charge in 50 ml of methanol in a 100 ml glass beaker. Triethylamine was added dropwise to the mixture, with stirring, until the green flakes precipitated assumed a light brown coloration. The supernatant liquor was decanted into a second glass beaker and the green precipitate was suspended in methanol. This procedure was repeated with the decanted solution until the resulting precipitate had assumed a markedly brown coloration and its colour cannot be removed again by adding a few drops of 1,6-hexanedithiol.

The resultant precipitate was isolated by filtration, washed with methanol and dried. The yield was 1.75 g (86%).

The compound melted at 56° C. with decomposition.

Example 4

Synthesis of $Mn^{2+}[S-(CH2)6-S]^{2-}$

A solution composed of 1.50 ml (9.93 mmol) of 1,6-hexanedithiol was used as initial charge in 25 ml, in a 100 ml round-bottomed flask with side valve and dropping funnel. A solution composed of 2.45 g (11.7 mmol) of manganous acetate dihydrate in 25 ml of methanol was added to the dropping funnel under a countercurrent of argon, and was slowly added dropwise to the mixture. Once the addition was complete, 2.00 ml (0.01 mol) of triethylamine was added. The pH of the solution is 10. Stirring of the solution was continued for a further 2 h at room temperature under argon. The precipitate was isolated by filtration, repeatedly washed with methanol and dried. The yield was 1.81 g (90%).

The compound melted at 139° C. with decomposition.

Explanations of Vulcanisate Tests

The following test methods and test apparatus were used: Rheometer: ASTM D 2084, Monsanto MDR 2000E. Tensile test: DIN 53405, S2 specimen. Hardness DIN 53505. Rebound resilience: DIN 53512. Tear propagation resistance: DIN 53504. Abrasion DIN 53516. Viscoelastic properties: DIN 53513/ISO 4664, Roelig test 10 Hz. Dynamic properties: DIN 53533.

Example 5

The novel vulcanizing agents were tested in a carbon-black-filled natural rubber mixture (100 parts of NR, 5 parts of ZnO RS, 3 parts of stearic acid, 45 parts of N330 carbon black, 2 parts of 6PPD, 5 parts of aromatic plasticizer). The preparation process used a Werner & Pfleiderer GK 1.5E internal mixer. Sulphur, accelerator (CBS) and vulcanizing agent were incorporated subsequently on a roll mill. The amounts stated are parts by weight per 100 parts by weight of rubber.

TABLE 1

Proportion of crosslinking agent

| | |
|---|---|
| Comparison 1: | 1 part of sulphur |
| Example 1: | 1.54 parts of compound according to Example 1, 1.24 parts of sulphur |
| Example 2: | 1.12 parts of compound according to Example 2, 0.93 part of sulphur |
| Example 3: | 1.28 parts of compound according to Example 3, 0.45 part of sulphur |
| Example 4: | 1.12 parts of compound according to Example 4, 0.93 part of sulphur |

3.4 parts of CBS were added as accelerator to each mixture.

TABLE 2

Determination of reversion in rheometer

| | Torque relative to Comparison 1 | Reversion relative to Comparison 1 |
|---|---|---|
| Comparison 1 | 100% | 100% |
| Example 1 | 94% | 4% |
| Example 2 | 91% | 8% |
| Example 3 | 97% | 5% |
| Example 4 | 97% | 73% |

Reversion in % was determined as follows from the rheometer data (160° C., 60 min):

(S'max−S'end)×1/S'max×100 (%), and calculated relative to comparison 1.

Table 2 shows that the mixtures according to the invention have markedly higher resistance to reversion (the smaller the reversion value, the higher the resistance to reversion) than comparative mixture 1.

Example 6

Test mixtures according to Table 3 were prepared with the aid of a Werner & Pfleiderer GK 1,5E internal mixer, using a rotor rotation rate of 40 rpm and a chamber and rotor temperature of 50° C. (ram pressure 8 bar, fill level 65%).

Accelerator, sulphur and the inventive zinc hexanyldithiol according to Example 1 were admixed on a roll mill. The quantitative data represent parts by weight per 100 parts by weight of rubber.

TABLE 3

Test mixing specification

| | Comparison | Invention |
|---|---|---|
| Mixture number | 1 | 2 |
| NR (TSR 5, Defo 1000) | 100 | 100 |
| RS zinc oxide | 5 | 5 |
| Stearic acid | 3 | 3 |
| N330 carbon black | 45 | 45 |
| 6PPD | 2 | 2 |
| Arom. plasticizer | 5 | 5 |
| Sulphur | 1.5 | 1.5 |
| CBS | 1.5 | 1.5 |
| Zinc hexanyldithiol According to Example 1 (invention) | 0 | 3.0 |

TABLE 4

Rheometer data

| | Comparison | Invention |
|---|---|---|
| Mixture number 160° C./60 min | 1 | 2 |
| t01 (min) | 1.85 | 0.66 |
| t90 (min) | 3.88 | 5.06 |
| S'max (dNm) | 14.44 | 13.92 |
| S'end (dNm) | 11.8 | 13.64 |
| Reversion (%) | 18.3 | 2.0 |

Reversion in % was determined as follows from the rheometer data:

(S'max−S'end)×1/S'max×100 (%)

Table 4 shows that the mixtures according to the invention have markedly higher resistance to reversion (the smaller the reversion value, the higher the resistance to reversion) than comparative mixture 1.

TABLE 5

Properties of test vulcanizates after optimized heating

| | Comparison | Invention |
|---|---|---|
| Mixture number | 1 | 2 |
| Vulcanization: 160° C./8 min | | |
| Strength (MPa) | 30 | 31 |
| Tensile strain at break (%) | 559 | 579 |
| 100 modulus (MPa) | 2.1 | 2.0 |
| 300 modulus (MPa) | 11.6 | 10.7 |
| Hardness at 23° C. (Shore A) | 61 | 59 |
| Elasticity at 23° C. (%) | 53 | 50 |
| Abrasion (mm$^3$) | 134 | 145 |
| Roelig 0° C. | | |
| tan delta | 0.169 | 0.168 |
| E' (MPa) | 6.755 | 6.496 |
| E" (MPa) | 1.125 | 1.093 |
| Roelig 60° C. | | |
| tan delta | 0.077 | 0.076 |
| E' (MPa) | 5.141 | 4.912 |
| E" (MPa) | 0.395 | 0.370 |

Table 5 shows that after optimized heating the properties of the vulcanizates according to the invention are comparable with those of the comparative vulcanizate.

TABLE 6

Properties of test vulcanizates after overheating

| | Comparison | Invention |
|---|---|---|
| Mixture number | 1 | 2 |
| Vulcanization: 160° C./120 min | | |
| Strength (MPa) | 25.3 | 26.7 |
| Tensile strain at break (%) | 553 | 481 |
| 100 modulus (MPa) | 1.7 | 2.0 |
| 300 modulus (MPa) | 9.1 | 11.4 |
| Hardness at 23° C. (Shore A) | 57 | 60 |
| Elasticity at 23° C. (%) | 47 | 51 |
| Abrasion (mm$^3$) | 236 | 148 |

TABLE 6-continued

Properties of test vulcanizates after overheating

| | Comparison | Invention |
|---|---|---|
| Roelig 0° C. | | |
| tan delta | 0.191 | 0.174 |
| E' (MPa) | 6.873 | 6.801 |
| E" (MPa) | 1.287 | 1.342 |
| Roelig 60° C. | | |
| tan delta | 0.104 | 0.086 |
| E' (MPa) | 4.675 | 5.054 |
| E" (MPa) | 0.486 | 0.435 |

Table 6 shows that, after overheating, the vulcanizates according to the invention have better retention of modulus, abrasion and loss factor (tan delta) than the comparative vulcanizate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixture comprising:
an unsaturated rubber; and
a vulcanizing agent comprising a metal alkanedithiol of the formula (I)

$$M^{2+}[S-(CH_2)_6-S]^{2-} \qquad (I)$$

wherein M is Zn, Cu, Fe, or Mn.

2. A process for vulcanizing an unsaturated rubber comprising vulcanizing said unsaturated rubber in the presence of the vulcanizing agent according to claim 1.

3. The process of claim 2, wherein the vulcanizing step is performed at a temperature of from about 120 to 220° C.

4. A process for preparing a vulcanized rubber mixture comprising mixing an unsaturated rubber with at least one additive and a vulcanization system comprising the vulcanizing agent according to claim 1.

5. The process according to claim 4, further comprising the presence of sulphur.

6. The mixture according to claim 1, wherein M is Zn.

7. The mixture according to claim 1, wherein M is Cu.

8. The mixture according to claim 1, wherein M is Fe.

9. The mixture according to claim 1, wherein M is Mn.

10. The process according to claim 5, wherein the sulphur is present in an amount of from about 0.05 to 2.5 parts by weight, based on 100 parts by weight of the unsaturated rubber.

* * * * *